G. E. MADISON.
LATHE TOOL.
APPLICATION FILED MAR. 11, 1918.

1,405,605.

Patented Feb. 7, 1922.

Inventor
George E. Madison
by his atty. Samuel E. Darby

UNITED STATES PATENT OFFICE.

GEORGE EDWIN MADISON, OF MUSKEGON, MICHIGAN, ASSIGNOR TO MANNING, MAXWELL & MOORE, INC., OF NEW YORK, N. Y., A CORPORATION OF NEW JERSEY.

LATHE TOOL.

1,405,605.   Specification of Letters Patent.   Patented Feb. 7, 1922.

Application filed March 11, 1918. Serial No. 221,590.

*To all whom it may concern:*

Be it known that I, GEORGE E. MADISON, a citizen of the United States, residing at Muskegon, county of Muskegon, State of Michigan, have made a new and useful Invention in Lathe Tools, of which the following is a specification.

This invention relates to lathe tools, and particularly to cutting tools employed in reciprocating holders or carrying bars.

The object of the invention is to provide a cutting tool structure which is simple and efficient and wherein the cutting tool is automatically brought into proper position for work in whatever direction the cutter holder or bar is moved.

Other objects of the invention will appear more fully hereinafter.

The invention consists substantially in the construction, combination, location, and relative arrangement of parts, all as will be more fully hereinafter set forth, as shown in the accompanying drawing, and finally pointed out in the appended claims.

In the drawing—

Figure 1:
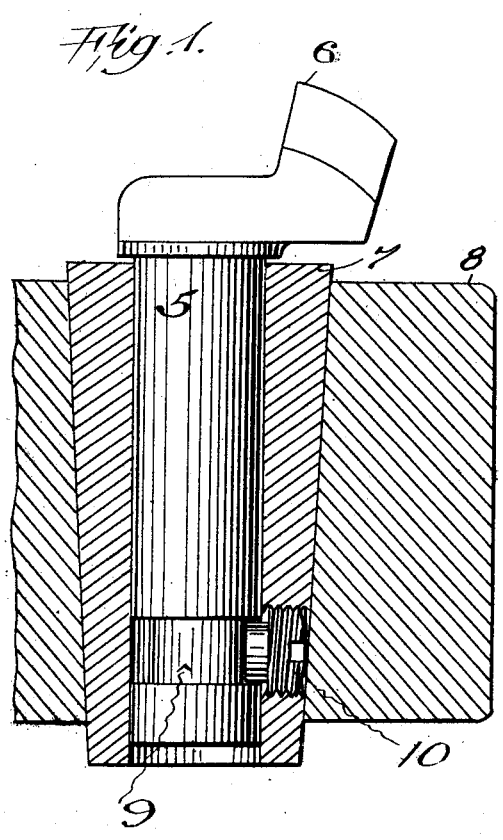
Fig. 1 is a view in longitudinal section on the line 1, 1, Fig. 2, showing a cutting tool and one form of holder therefor, and embodying the principles of my invention.
Figure 2:
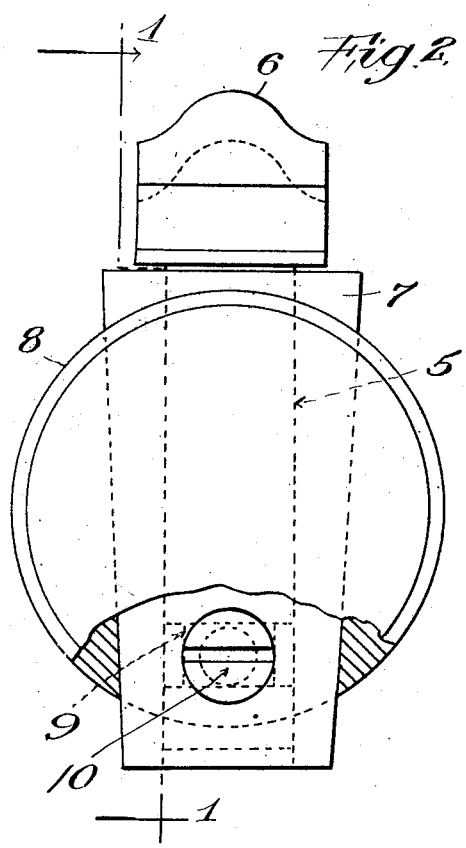
Fig. 2 is an end view of a tool bar, parts broken out and parts in section, showing the application thereto of a cutter and its holder embodying my invention.
Figure 3:
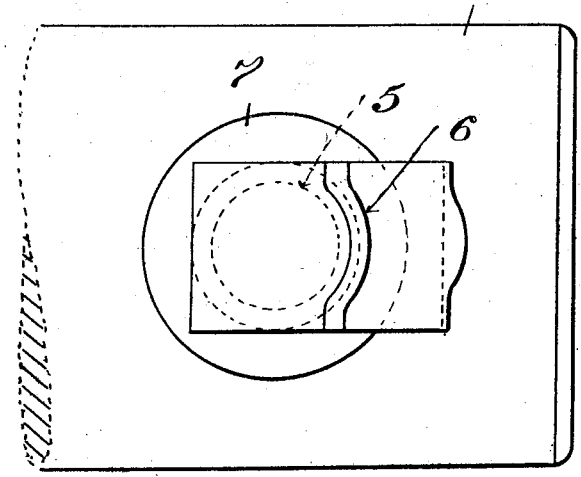
Fig. 3 is a plan view of the same.

In certain kinds of lathe work, particularly where the cutter carrying bar is reciprocated, it is desirable to effect a cutting operation while the bar is moving in both directions of its reciprocatory movements. This is the case where, for illustration, a lubricating groove is to be cut in the interior surface of a bushing. To accomplish this the cutter should be shifted at each change in direction of movement of its carrying bar so that its cutting edge will be brought in proper position for work whichever may be the direction of movement of the cutter carrying bar.

It is among the special purposes of my present invention to provide a cutter structure wherein the cutting edge of the cutter will be properly aligned to its work for each direction of movement of its carrying bar.

In the drawing I have shown an illustrative arrangement embodying my invention wherein the cutter is shown as including a shank portion 5, and a cutting edge 6. The cutting edge is located at the end but somewhat offset and inclined away from the longitudinal axis of the shank. The shank is mounted so as to freely rotate axially. This result may be attained in any suitable manner. A simple arrangement is shown wherein the shank is made cylindrical and is extended into the cylindrical bore of a bushing or sleeve 7 which is mounted to rotate in a suitable tool holder or bar 8. The cutter may be retained in the sleeve or bushing in any suitable or convenient manner which permits free axial rotation of the tool shank in the bushing. A simple illustrative arrangement for accomplishing this is shown wherein the shank is circumferentially grooved, as at 9, to receive the end of a set screw 10, tapped through the sleeve 7.

The cutter shank is disposed transversely of the bar 8, though this is not an essential detail.

The bar 8 may be of any suitable form or structure. The sleeve 7 is retained in a slot or opening through the bar in any convenient manner. In the illustrative arrangement shown the sleeve is exteriorly tapered to fit a complementary taper in the seat or slot in the bar. The pressure of the cutter when working is against the end of the bushing.

From this description it will be readily seen that when the bar 8 is moved in one direction and the cutting edge of the cutter is brought into contact with the revolving work the shank will move rotatively until the cutting edge assumes a position of drag with reference to the direction of movement of the tool relative to the surface to be grooved. When the bar moves in the other direction the same operation occurs, and hence the cutter automatically adjusts itself with reference to the direction of movements of its carrying bar and the bushing so as to bring the cutting edge of the cutter in proper position to perform its work in whichever direction the cutter bar may be traveling over the work.

It is obvious that the relative movement of the cutter and the work operated upon may be secured by the movement of the cutter or of the work, or of both—either separately or simultaneously. In making the grooves for lubricant in a bushing, both the bushing and the cutter move. One of them, preferably the bushing, rotates and the other has a reciprocating motion. These two motions at the same time result in a spiral groove in the bushing.

While I have mentioned the use of an automatically adjusting cutter embodying my invention in connection with the cutting of a lubricant distributing groove in a bearing bushing, I do not, of course, confine myself to this particular use as the same structure is equally effective for cutting operations on flat surfaces and on surfaces other than the wearing surfaces of bushings.

Having now set forth the objects and nature of my invention, and a structure embodying the principles thereof, what I claim as new and useful, and of my own invention, and desire to secure by Letters Patent, is:—

1. The combination with a cutter bar having a tapered seat, and an exteriorly tapered sleeve seated in said seat, said sleeve having a cylindrical bore, of a cutting tool having a cylindrical shank journaled in the bore of said sleeve for free rotation therein, and a cutting edge at the end of said shank, and means to retain said shank in said sleeve.

2. The combination with a cutter bar having a tapered seat, and an exterior tapered sleeve seated in said seat, said sleeve having a cylindrical bore, of a cutting tool having a cylindrical shank journaled in the bore of said sleeve for free rotation therein, and an off-set cutting edge at the end of said shank.

In testimony whereof I have hereunto set my hand on this 9th day of October A. D., 1917.

GEORGE EDWIN MADISON.